United States Patent
Sehanobish et al.

(10) Patent No.: US 10,315,395 B2
(45) Date of Patent: Jun. 11, 2019

(54) MULTILAYER FILMS, METHODS OF MANUFACTURE THEREOF AND ARTICLES COMPRISING THE SAME

(71) Applicant: DOW GLOBAL TECHNOLOGIES LLC, Midland, MI (US)

(72) Inventors: Kalyan Sehanobish, Saford, MI (US); Santosh S. Bawiskar, Sugar Land, TX (US); Eric Hui Chin Tu, Taiwan (CN); Peter Kwok-Wai Fung, The Warren (SG); Peter Yap, Singapore (SG); Xiaosong Wu, Sugar Land, TX (US); Rajen M. Patel, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/540,738

(22) PCT Filed: Dec. 16, 2015

(86) PCT No.: PCT/US2015/065990
§ 371 (c)(1),
(2) Date: Jun. 29, 2017

(87) PCT Pub. No.: WO2016/109196
PCT Pub. Date: Jul. 7, 2016

(65) Prior Publication Data
US 2017/0355179 A1      Dec. 14, 2017

(30) Foreign Application Priority Data
Dec. 29, 2014    (SG) ............................. 10201408774T

(51) Int. Cl.
B32B 27/32    (2006.01)
B29B 9/06     (2006.01)
(Continued)

(52) U.S. Cl.
CPC .............. *B32B 27/32* (2013.01); *B29B 7/002* (2013.01); *B29B 9/06* (2013.01); *B29C 47/0004* (2013.01);
(Continued)

(58) Field of Classification Search
None
See application file for complete search history.

(56) References Cited

U.S. PATENT DOCUMENTS

| 5,415,827 A | 5/1995 | Tomka et al. |
| 5,627,223 A | 5/1997 | Dehennau et al. |

(Continued)

FOREIGN PATENT DOCUMENTS

| CA | 2060650 A1 | 10/1991 | |
| WO | WO-2014190395 A1 * | 12/2014 | ............. C08L 23/06 |

OTHER PUBLICATIONS

International Preliminary Report on Patentability for International Application No. PCT/US2015/065990, International Filing Date Dec. 16, 2015; dated Feb. 28, 2017, 17 pages.

(Continued)

*Primary Examiner* — Catherine S Branch
(74) *Attorney, Agent, or Firm* — Cantor Colburn LLP

(57) ABSTRACT

Disclosed herein is a multilayered article comprising a core layer comprising a thermoplastic polymer; where the thermoplastic polymer comprises a polyolefin, thermoplastic starch, and a compatibilizer; where the compatibilizer does not contain ethylene acrylic acid; where the polyolefin is not polypropylene and where the polyolefin present in an amount of greater than 40 wt %, based on a total weight of the core layer; a first layer comprising a thermoplastic resin; and a second layer comprising a thermoplastic resin; where the first layer and the second layer are devoid of fillers; where the first layer is disposed on a side of the core layer (Continued)

that is opposed to the side that contacts the second layer; where the multilayered article has an optical clarity of greater than 80% when measured as per ASTM D 1746 and a total haze less than 8% when measured as per ASTM D 1003.

8 Claims, 1 Drawing Sheet

(51) Int. Cl.
    *B32B 9/02*     (2006.01)
    *B29C 47/06*     (2006.01)
    *B29B 7/00*     (2006.01)
    *B29C 47/00*     (2006.01)
    *B29C 47/10*     (2006.01)
    *B32B 9/04*     (2006.01)
    *B32B 27/08*     (2006.01)
    *B32B 27/18*     (2006.01)
    *B32B 27/20*     (2006.01)
    *B32B 27/22*     (2006.01)
    *B29C 47/30*     (2006.01)
    *B29K 105/00*     (2006.01)
    *B29K 23/00*     (2006.01)
    *B29L 7/00*     (2006.01)
    *B29L 9/00*     (2006.01)

(52) U.S. Cl.
    CPC ...... *B29C 47/0011* (2013.01); *B29C 47/0021* (2013.01); *B29C 47/065* (2013.01); *B29C 47/1027* (2013.01); *B29C 47/1063* (2013.01); *B29C 47/1081* (2013.01); *B29C 47/30* (2013.01); *B32B 9/02* (2013.01); *B32B 9/045* (2013.01); *B32B 27/08* (2013.01); *B32B 27/18* (2013.01); *B32B 27/20* (2013.01); *B32B 27/22* (2013.01); *B29K 2003/00* (2013.01); *B29K 2023/00* (2013.01); *B29K 2023/0633* (2013.01); *B29K 2105/0038* (2013.01); *B29K 2105/0088* (2013.01); *B29L 2007/008* (2013.01); *B29L 2009/00* (2013.01); *B32B 2270/00* (2013.01); *B32B 2307/40* (2013.01); *B32B 2307/412* (2013.01); *B32B 2307/558* (2013.01); *B32B 2307/5825* (2013.01); *B32B 2307/7163* (2013.01); *B32B 2307/72* (2013.01); *B32B 2317/20* (2013.01); *B32B 2439/70* (2013.01)

(56) References Cited

U.S. PATENT DOCUMENTS

| | | |
|---|---|---|
| 6,242,102 B1 | 6/2001 | Tomka |
| 2004/0247752 A1 | 12/2004 | Koenig et al. |
| 2009/0312462 A1 | 12/2009 | Oakley et al. |
| 2010/0314162 A1 | 12/2010 | Gardner et al. |
| 2012/0009387 A1 | 1/2012 | Wang et al. |
| 2012/0315416 A1 | 12/2012 | Chen et al. |
| 2013/0046262 A1 | 2/2013 | Wang et al. |
| 2013/0154151 A1 | 6/2013 | Wang et al. |
| 2014/0319003 A1 | 10/2014 | Hawighorst et al. |
| 2015/0118470 A1 | 4/2015 | Soliman et al. |
| 2016/0107426 A1 | 4/2016 | Leufgens |

OTHER PUBLICATIONS

International Search Report for International Application No. PCT/US2015/065990, International Filing Date Dec. 16, 2015; dated May 10, 2016, 7 pages.

Written Opinion for International Application No. PCT/US2015/065990, International Filing Date Dec. 16, 2015; dated May 10, 2016, 5 pages.

* cited by examiner

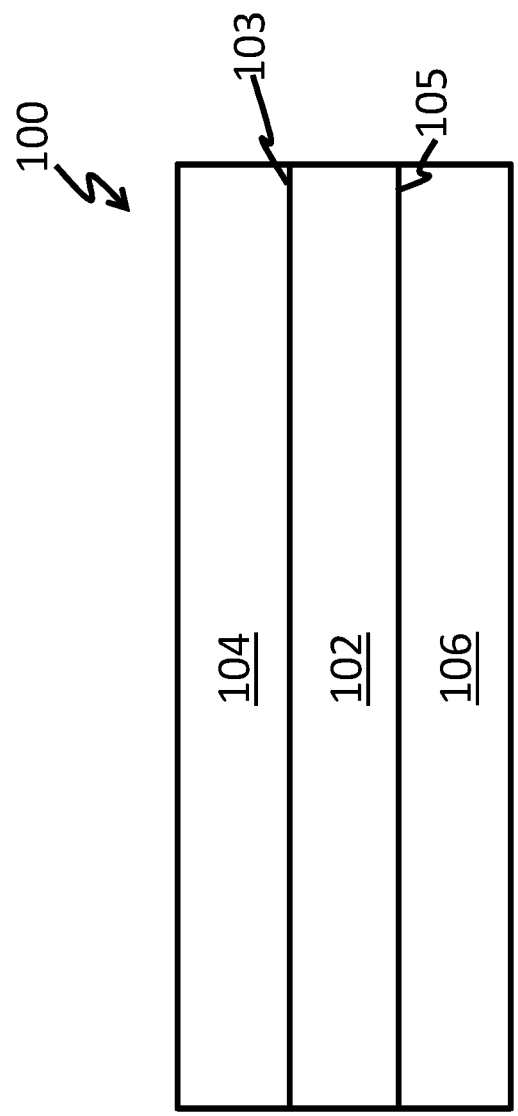

MULTILAYER FILMS, METHODS OF MANUFACTURE THEREOF AND ARTICLES COMPRISING THE SAME

CROSS REFERENCE TO RELATED APPLICATIONS

This application is a National Stage application of PCT/US2015/065990, filed Dec. 16, 2015, which claims the benefit of S.G. Application No. 10201408774T, filed Dec. 29, 2014, both of which are incorporated by reference in their entirety herein.

BACKGROUND

This disclosure relates to multilayer films, methods of manufacture thereof and to articles comprising the same. In particular, this disclosure relates to multilayer films that comprise polyolefins and starch.

Films for food, industrial and specialty packaging are under pressure to reduce their impact on the environment due to their origin based on oil derivatives such as ethylene. There is a growing interest in using films for packaging that contains components that are renewable or that are based on materials that are not derived from fossil fuels (hereinafter "environmentally friendly materials"). Usually these environmentally friendly materials undergo deterioration in film performance over time which makes them unsuitable for packaging applications. In addition, their mechanical performance is poor when compared with other films and this necessitates an increase in film thickness that offsets any improvement in sustainability. In order to overcome these drawbacks, polymers such as polyethylenes are often added to the environmentally friendly materials.

Films containing polyolefins and starch (an environmentally friendly material because it is produced from renewable resources and is compostable) are useful in a variety of different applications. Common applications for such films are packaging, containers, separators, dividers, or the like. One of the drawbacks of these films that if the processing temperature or temperature of usage rises above the thermal stability temperature of starch the films begins to smoke. Another drawback is the optical clarity of such films which tend to be hazy and not optically clear.

It is therefore desirable to develop films that comprise polyolefins and starch where the ability to smoke is minimized and that are optically clear.

SUMMARY

Disclosed herein is a multilayered article comprising a core layer comprising a thermoplastic polymer; where the thermoplastic polymer comprises a polyolefin, thermoplastic starch, and a compatibilizer; where the compatibilizer does not contain ethylene acrylic acid; where the polyolefin is not polypropylene and where the polyolefin is present in an amount of greater than 40 wt %, based on a total weight of the core layer; a first layer comprising a thermoplastic resin; and a second layer comprising a thermoplastic resin; where the first layer and the second layer are devoid of fillers; where the first layer is disposed on a side of the core layer that is opposed to the side that contacts the second layer; where the multilayered article has an optical clarity of greater than 80% when measured as per ASTM D 1746 and a total haze less than 10% when measured as per ASTM D 1003.

Disclosed herein is a method of manufacturing a thermoplastic starch composition comprising extruding in a single pass a composition that comprises a polyolefin, starch, glycerol and a compatibilizer; where the composition or portions of the composition are not premixed prior to blending in the extruder; injecting the glycerol into the extruder; and pelletizing the composition.

BRIEF DESCRIPTION OF THE FIGURES

The FIGURE depicts a multilayered article comprising a core layer having a first layer and a second layer;

DETAILED DESCRIPTION

Disclosed herein are multilayer films that comprise a core layer that comprises polyolefins and thermoplastic starch (TPS). Disclosed herein too is a multilayered article comprising a core layer that comprises a polyolefin, a thermoplastic starch, and a compatibilizer. The compatibilizer present in the core layer does not contain ethylene acrylic acid copolymer and the polyolefin is present in the core layer in an amount of greater than 40 wt %, based on a total weight of the core layer. The polyolefin of the core layer is not polypropylene and does not contain any fillers. Polyolefins having less than 50 wt % propylene are not considered polypropylene for purpose of this invention. Copolymers having ethylene and propylene may therefore be used, when the propylene content is less than 50 wt %, based on the total weight of the polyolefin. The multilayered film further comprises a first layer and a second layer both of which comprise a thermoplastic resin; and where the first layer and the second layer are devoid of fillers. The multilayered article has a clarity of greater than 75% when measured as per ASTM D1746 and total haze less than 8% when measured as per ASTM D 1003. The multilayer films are advantageous in that they do not produce any smoke at processing temperatures of 170 to 210° C.

The FIGURE depicts a multilayered article 100 comprising a core layer 102 having a first layer 104 and a second layer 106. It is to be noted that either the first or the second layer can be optional. The core layer 102 has a first surface 103 and a second surface 105 that is opposed to the first surface 103. As can be seen in the FIGURE, the second layer 106 is disposed on an opposing surface of the core layer 102 from the surface that contacts the first layer 104. The second layer 106 contacts the core layer 102 at the second surface 105 and the first layer 104 contacts the core layer at the first surface 103. It is to be noted that not all layers of the multilayered article 100 contain starch. The first layer and/or the second layer may not contain the starch.

The core layer comprises a polyolefin that is not polypropylene, a thermoplastic starch and a compatibilizer. In an embodiment, the core layer does not contain polypropylene in any form. In another embodiment, copolymers having ethylene and propylene may therefore be used, when the propylene content is less than 50 wt %, based on the total weight of the polyolefin.

The core layer comprises a polyolefin, a thermoplastic starch (starch+plasticizer) and a compatibilizer without any filler. The ingredients used to manufacture the core layer (i.e., the polyolefin, the thermoplastic starch (starch+plasticizer) and the compatibilizer) are called a thermoplastic starch composition. The thermoplastic starch composition is manufactured in a single step where the ingredients are all fed to a mixing device without any premixing or masterbatching and are compounded to form pellets, or alternatively, to form the first layer. This single step process is advantageous over other present methods of manufacturing the same composition because most of these present methods use two or more manufacturing steps. The use of a single manufacturing step is advantageous in that it avoids additional premixing and blending steps, is completed faster and more efficiently and results in less waste when compared with other commercial manufacturing methods. The core layer does not contain any filler.

The polyolefin is generally a homopolymer polyethylene and can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), metallocene catalyzed linear low density polyethylene (mLLDPE), polyethylene based plastomers and elastomers, or a combination thereof. In an exemplary embodiment, the polyolefin is linear low density polyethylene (LLDPE) having a density of 0.905 g/cm$^3$ to 0.940 g/cm$^3$, preferably 0.915 g/cm$^3$ to 0.925 g/cm$^3$.

Polyolefin elastomers are ethylene-α-olefin copolymers and can be made with a single-site catalyst such as a metallocene catalyst or constrained geometry catalyst. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane.

Illustrative homogeneously branched ethylene-α-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random copolymers or block copolymers.

Examples of commercially available homogeneously branched ethylene-α-olefin interpolymers useful in the composition include homogeneously branched, linear ethylene-α-olefin copolymers (e.g. TAFMER® by Mitsui Petrochemicals Company Limited and Exact™ by ExxonMobil Chemical Company), and the homogeneously branched, substantially linear ethylene-α-olefin polymers (e.g., AFFINITY™ and ENGAGE™ polyethylene available from The Dow Chemical Company). Blends of any of these interpolymers can also be used in the composition. An exemplary blend is AFFINITY™ PL1880G commercially available from The Dow Chemical Company.

The polyolefin has a melt index ($I_2$) of 0.1 to 10 g/10 minutes, preferably 0.5 to 5, preferably 1 to 4, and more preferably 1 to 3 dg/minute (g/10 minutes) at 190° C. and 2.16 kg as determined by ASTM D 1238.

The polyolefin is used in an amount of 40 to 80 weight percent (wt %), preferably 45 to 70 wt %, and more preferably 50 to 65 wt %, based on a total weight of the core layer 102.

Starch is a plentiful, inexpensive and renewable material that is found in a large variety of plant sources, such as grains, tubers, fruits, and the like. Starch is readily biodegradable and it does not persist in the environment as a harmful material when disposed of. Because of the biodegradable nature of starch it has been incorporated into multi-component compositions in various forms, including as a filler, binder, or as a constituent within thermoplastic polymer blends.

The starch from which the thermoplastic starch may be derived includes, but is not limited to, corn starch, potato starch, wheat starch, soy bean starch, tapioca starch, hi-amylose starch or combinations thereof. Starch comprises two types of alpha-D-glucose polymers amylose, a substantially linear polymer with a number average molecular weight of the order of $1 \times 10^5$ grams per mole; and amylopectin, a highly branched polymer with a very high number average molecular weight of the order of $1 \times 10^7$ grams per mole. Each repeating glucose unit has three free hydroxyl groups, thereby providing the polymer with hydrophilic properties and reactive functional groups. Most starches contain 20 to 30 wt % amylose and 70 to 80 wt % amylopectin. However, depending on the origin of the starch the ratio of amylose to amylopectin can vary significantly. For example, some corn hybrids provide starch with 100 wt % amylopectin (waxy corn starch), while other have a progressively higher amylose content ranging from 50 to 95 wt %, based on the total weight of the starch. Starch usually has a water content of up to about 15 wt %, preferably 2 to 12 wt %, based on the total weight of the starch. However, the starch can be dried to reduce its water content to below 1 wt %, based on the total weight of the starch. Starch used herein generally exists in small granules having a crystallinity ranging from about 15 to 45 wt %, based on the total weight of the starch.

Starch may be added as in a variety of different forms, such as, for example, an inert filler, generally in its native, unmodified state, which is a water-insoluble, granular material. In such cases, the starch granules will normally behave as any other solid particulate filler and will contribute little, if any, in terms of improving the mechanical properties of the resulting material. Alternatively, starch that has been gelatinized, dried, and then ground into a powder may also be added as a particulate filler. Although starch may be added as a filler its use in the core layer is as a thermoplastically processable component in conjunction with the polyolefin and with a compatibilizer.

The thermoplastic starch phase generally interacts with the other phases present in the core layer and facilitates holding them together when the thermoplastic phase is in a solid state. The thermoplastic starch phase generally comprises starch and a plasticizer that is capable of causing the starch to behave as a thermoplastic material that can form a melt when heated rather than thermally decomposing.

This "native" or "natural" form of starch may also be chemically modified for use in the core layer. Chemically modified starch includes oxidized starch, etherified starch, esterified starch, cross-linked starch, or a combination thereof. Chemically modified starch is generally prepared by reacting the hydroxyl groups of starch with one or more reagents. The degree of reaction, often referred to as the degree of substitution (DS), can significantly alter the physiochemical properties of the modified starch compared with the corresponding native starch. The DS for a native starch can range up to 3 for a fully substituted modified starch. Depending upon the type of substituent and the DS, a chemically modified starch can exhibit considerably different hydrophilic/hydrophobic character relative to native starch.

Suitable etherified starches include those which are substituted with ethyl and/or propyl groups. Suitable esterified starches include those that are substituted with actyl, propanoyl and/or butanoyl groups.

Suitable etherified starches include those which are substituted with ethyl and/or propyl groups. Suitable esterified starches include those that are substituted with actyl, propanoyl and/or butanoyl groups. Table A below shows several different starches and their ingredients.

TABLE A

| Starch type | Amylose content (wt %)* | Amylopectin content (wt %) | Moisture content (wt %) | Crystallinity (wt %) |
|---|---|---|---|---|
| Wheat | 26-27 | 72-73 | 13 | 36 |
| Maize | 26-28 | 71-73 | 12-13 | 39 |
| Waxy Starch | <1 | 99 | N.d.** | 39 |
| Amylomaize | 50-80 | 20-50 | N.d. | 19 |
| Potato | 20-25 | 79-74 | 18-19 | 25 |

*All wt %'s are based on the total weight of the starch.
**N.d.—not determined

Starches having a crystallinity between 30 and 42 wt %, preferably between 35 and 40 wt %, based on the total weight of the starch are preferred. In an exemplary embodiment, the starch is a wheat starch. A preferred starch is thermoplastic wheat starch. Maize starch (also called corn starch) may also be used.

Both native and chemically modified starch generally exhibit poor thermoplastic properties. To improve such properties, the starch may be converted to thermoplastic starch (TPS) by melt processing it with one or more plasticizers. Polyhydric alcohols are generally used as plasticizers in the manufacture of thermoplastic starch.

Suitable polyhydric alcohols include glycerol, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neo-pentyl glycol, trimethylol propane, pentaerythritol, sorbitol, mannitol and the acetate, ethoxylate, propoxylate derivatives, or combinations thereof. In an exemplary embodiment, the thermoplastic starch comprises a glycerol plasticizer.

The plasticizer content of the thermoplastic starch is 5 wt % to 50 wt %, preferably 10 wt % to 40 wt %, and more preferably 15 wt % to about 30 wt %, based on the combined mass of the starch and the plasticizer.

The thermoplastic starch (i.e., the combined weight of the starch with the plasticizer) is present in the core layer in an amount of 2 to 40 wt %, preferably 3 to 30 wt % and more preferably 4 to 25 wt %, based on the total weight of the core layer 102.

As noted above, the core layer 102 comprises a compatibilizer. The compatibilizer is generally a copolymer of an unsaturated carboxylic acid or a derivative of an unsaturated carboxylic acid and an olefin polymer. Examples of unsaturated carboxylic acids are maleic acid, fumaric acid, itaconic acid, methacrylic acid, crotonic acid, malonic acid, succinic acid, glutaric acid, adipic acid, pimelic acid, suberic acid, azelaic acid, sebacic acids, citraconic acid, or combinations thereof. Examples of derivatives of unsaturated carboxylic acids are maleic anhydride, citraconic anhydride, itaconic anhydride, malonic anhydride, succinic anhydride, glutaric anhydride, adipic anhydride, pimelic anhydride, suberic anhydride, azelaic anhydride, methyl acrylate, methyl methacrylate, ethyl acrylate, ethyl methacrylate, butyl acrylate, butyl methacrylate, glycidyl acrylate, glycidyl methacrylate, or the like, or a combination thereof. Maleic anhydride is the preferred grafting compound. One or more, preferably one, grafting compound is grafted onto the olefin polymer. The copolymer may be a terpolymer and may contain both an unsaturated carboxylic acid as well as a derivative of an unsaturated carboxylic acid in addition to the polyolefin.

The content of the compatibilizer is 0.5 to 10 wt %, preferably 1 to 9 wt %, and more preferably 2 to 7 wt %, based on the total weight of the core layer. In one embodiment, the weight of the compatibilizer is less than 3 wt %, preferably less than 2 wt %, based on the total weight of the core layer. In an embodiment, the weight of the compatibilizer used in the core layer is from 0.5 to 1.5 wt %, based on the total weight of the core layer.

The core layer and the first and second layers may contain antioxidants, antiozonants, thermal stabilizers, ultraviolet stabilizers, or the like, or a combination thereof. The core layer and the first and second layers do not contain any colorants or flavorants.

The core layer generally has a thickness of 20 to 50 micrometers, preferably 25 to 45 micrometers.

As detailed above in the FIGURE, the core layer 102 has a first layer 104 and a second layer 106 contacting it on opposing surfaces. The first layer and the second layer both comprise polyolefins. The polyolefins may be selected from the group of polyolefins listed above. In an exemplary embodiment, the first and the second layer may contain up to 100 wt % of the polyolefin. In an exemplary embodiment, the polyolefin used in the first and the second layer is linear low density polyethylene.

In another embodiment, at least one of the first layer or the second layer may contain the thermoplastic starch in addition to the polyolefin. If the first layer or the second layer contains thermoplastic starch, then the starch is present in the same amounts as in the core layer.

The first layer generally has a thickness of 2 to 10 micrometers, preferably 3 to 8 micrometers. The second layer generally has a thickness of 2 to 10 micrometers, preferably 3 to 8 micrometers. The first and the second layers can adhere to the core layer without the use of intermediate or tie layers. In short, the presence of polyolefin in the first and the second layer and in the core layer facilitates adhesion between the respective layers of the multilayered article. The first and the second layers are in direct contact with the core layer. The thickness ratio of the core layer to the first layer or to the second layer is 1:1 to 4:1.

In one embodiment, in one method of manufacturing the thermoplastic starch composition, all of the ingredients are produced in a single compounding or mixing step using a mixing device. In short, all of the ingredients (the polyolefin, the starch, the plasticizer and the compatibilizer) are fed only to the mixing device without any preblending (e.g., in mixing devices such as Waring blenders, Henschel mixers, extruders, or the like) or masterbatching of the ingredients. The polyolefin, the starch, the compatibilizer, and the plasticizer are all fed into the mixing device in a single step and the extrudate is collected and further processed.

The ingredients to form the thermoplastic starch composition are processed in an extruder. The polyolefin, the starch, and the compatibilizer are fed to the throat of the extruder, while the compatibilizer is injected into the extruder downstream of the throat.

The extruder may be a single screw extruder, a twin screw extruder or a multi-screw extruder (e.g., having more than 2 screws). Twin screw extruders are preferred. Examples of extruders that are used to produce the thermoplastic starch composition in a single step are co-rotating twin screw extruders or counter-rotating twin screw extruders with either intermeshing or non-intermeshing screws. A preferred extruder is a co-rotating twin screw extruder with intermeshing screws (also known as "self-wiping" screws).

In one embodiment, the extrudate is in the form of pellets that may further be processed into the core layer. In another embodiment, the extrudate is in the form of a film which may be used to form the core layer. In a preferred embodiment, the thermoplastic starch composition is extruded into pellets that are then manufactured into the core layer in a co-extrusion process, which is detailed next.

In an embodiment, the core layer is manufactured by feeding the polyolefin, the starch, and the compatibilizer into the throat of the extruder, while the plasticizer is injected into the extruder downstream of the throat. The extrudate may be in the form of pellets or alternatively in the form of a film. In an exemplary embodiment, the extrudate is in the form of a film.

The extruder used to produce the pellets and/or the core layer is operated at a temperature of 140 to 210° C. The pressure in some regions of the extruder is about 300 to 500 pounds per square inch.

The screw configuration used in the self-wiping co-rotating twin screw extruder in making the polyethylene-thermoplastic starch (TPS) blend is detailed below. If the screw configuration mixes the ingredients with a low intensity the right morphology will not be achieved in the thermoplastic starch composition. This will result in poor dispersion of the starch in the polyethylene and produces inferior mechanical and optical properties. Conversely, if the screw configuration results in mixing that is too intense, a melt temperature higher than the starch degradation temperature will result leading to yellowing or even charring of the starch. As a result an optimum balance is desirable between melt temperature, residence time and mixing intensity. The desired melt temperature is less than 200° C. and a useful residence time in the extruder is less than a minute. The optimum balance desirable between melt temperature, residence time and mixing intensity is determined by the screw design and the process conditions.

The screw configuration used for producing the thermoplastic starch composition comprises at least two mixing sections or zones, with three or four mixing sections or zones being preferred. The mixing zones are separated by screw elements. The screw elements serve to convey the material forward and are not pressurized or fully filled and do not cause any mixing. The screw elements in the first barrel zone facilitate the intake of the powdered starch into the extruder. These screw elements in the first barrel zone have larger pitch and may be undercut to increase material intake by increasing available volume. Larger pitch screw elements have a higher conveying capacity and are preferably used in this zone.

The mixing zones are disposed downstream of the first barrel zone. Each mixing zone has restrictive elements that cause back pressure which increase the level of fill in the mixing zones. The elements used in the mixing zones are typically kneading disk blocks of different design. Based on the kneading disk block design the applied stress and energy input can be to each mixing zone can be controlled. Each mixing zone comprises 3 to 4 kneading disk blocks which may be right handed, left handed or neutral depending on their staggering angle. Further the width and number of disks in each kneading disk block can be varied. Other mixing elements such as continuous mixing elements (CME's), screw mixing elements (SME's), turbine mixing elements (TME's), fractional mixing elements (FME's), fractional kneading blocks (FKB's) blister rings, and the like, may be used. The TME's are used in the mixing zone to avoid slippage and aid incorporation of the glycerol in to the starch and polyethylene blend. The glycerol is injected right above the TME's. Vacuum is pulled after the last mixing zone and before the die to help devolatilize any water from the starch.

In an embodiment, the pelletized thermoplastic starch composition (manufactured as detailed above) is then used to manufacture the core layer. The core layer may be manufactured by extrusion, casting, blowing the film, or the like.

In an embodiment, the multilayered article may be produced by coextrusion. The core layer, the first layer and/or the second layer are each extruded from separate extruders and contact each other to form the multilayered article. Extruders can be single screw extruders or multiple screw extruders (e.g., twin screw extruders). In one embodiment, the core layer, the first layer and/or the second layer are then laminated together in a roll mill to form the multilayered article. Other methods of lamination such as, for example, compression molding may also be used.

While it is noted that the core layer, the first layer and/or the second layer may be manufactured via extrusion (i.e., using a co-rotating twin screw extruder) it is submitted that other devices may be used for mixing the ingredients to produce the respective layers. Blending of ingredients involves the use of shear force, extensional force, compressive force, and thermal energy or combinations comprising at least one of the foregoing forces and forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Blending may be conducted in a counter-rotating intermeshing twin screw extruder, counter-rotating tangential twin screw extruder, Buss kneader, a Banbury, roll mills, Farrel continuous mixers, or the like, or combinations comprising at least one of the foregoing machines.

The multilayered article displays a clarity of greater than 75%, preferably greater than 80% and more preferably greater than 85% when measured as per ASTM D1746 and total haze less than 10%, preferably less than 8% and more preferably less than 5% when measured as per ASTM D1003.

Clarity is the ability of the sample to transmit the fine details of an object viewed through it. Maximum clarity is therefore achieved by minimizing the size of scattering centers as it is strongly related to the angular distribution of the scattering intensity. It is also affected by the distance between the object viewed and the sample.

The multilayered article generally has a 1% secant modulus of 135 to 200 MPa, preferably 140 to 180 MPa when measured in the machine direction and a 1% secant modulus of 130 to 190 MPa, preferably 135 to 180 MPa when measured in the transverse direction, when measured as per ASTM D882.

The multilayered article displays a machine direction Elmendorf N50 of 400 to 900, preferably 600 to 800 grams when measured as per ASTM D1922; and a cross machine direction Elmendorf N50 of 750 to 1200, preferably 800 to 950 grams when measured as per ASTM D1922.

The dart impact strength measured as per ASTM D1709 is 200 to 450 grams, preferably 225 to 350 grams.

The compositions and the method of manufacture disclosed herein are detailed in the following non-limiting examples.

EXAMPLE

Example 1

This example was conducted to demonstrate the manufacturing of a multilayered article that contains a core layer that comprises a polyolefin, thermoplastic starch and a compatibilizer. The multilayered article comprises a first layer and a second layer in addition to the core layer.

Table 1 shows two comparative examples (Comparative sample #1 and #2) and one example (Sample #1) that reflects the disclosed composition. Comparative Sample #1 contains three layers all of which contain only the polyolefin (DOWLEX® 2045 G), while Comparative Sample #2 contains there layers each of which have the polyolefin (DOWLEX 2045G) as well as the thermoplastic starch (CARDIA® BL-F). The CARDIA® BL-F contains 66 wt % of renewable content (e.g., the starch).

TABLE 1

| | Comparative Sample #1 | Comparative Sample #2 | Sample #1 |
|---|---|---|---|
| Outer Layer | DOWLEX 2045G | DOWLEX 2045G (69 wt %) + CARDIA BL-F (31 wt %) | Experimental LLDPE grade having a melt index ($I_2$) of 0.8 dg/10 minutes and a density of 0.919 g/cc. |
| Core Layer | DOWLEX 2045G | DOWLEX 2045G (69 wt %) + CARDIA BL-F (31 wt %) | DOWLEX 2036P (30 wt %) + Cardia BL-F (70 wt %) |
| Inner Layer | DOWLEX 2045G | DOWLEX 2045G (69 wt %) + CARDIA BL-F (31 wt %) | Experimental LLDPE grade having a melt index ($I_2$) of 0.8 dg/10 minutes and a density of 0.919 g/cc. |
| µm | 25.4 um | 25.4 um | 36.7 um |

The 3-layer coextruded films were produced on a Reifenhauser blown film machines with 60/70/60 extruders and a 250 mm die. The manufacturing conditions are shown in the Table 2 below. The table below shows the manufacturing conditions. Three extruders (A, B and C) were used to coextrude the multilayered film. The die temperatures are also shown below.

The properties of the respective compositions are shown below in the Table 3.

TABLE 3

| | | SAMPLE # | | |
|---|---|---|---|---|
| TEST ITEM | | Comparative Sample #1 | Comparative Sample #2 | Sample #1 |
| PROFILE | µm | 25.4 | 25.4 | 36.7 |
| Secant Modulus @2% (MD) | MPa | 200.5 | 132.4 | 120.67 |
| Secant Modulus @2% (TD) | MPa | 214.1 | 126.2 | 132.65 |
| ELEMENDORF TEAR - ASTM D1922 | | | | |
| MD @ 3200 gm | N | 384 | 352 | 345 |
| TD @ 3200 gm | N | 624 | 664 | 1121 |
| DART IMPACT - ASTM D1709, Type A | g | 217 | 317 | 208 |
| Haze - ASTM D1003-01 | % | 8.0 | 89.0 | 35.5 |
| Smoke | — | No | Severe | No |

From this example, it may be seen that the disclosed sample does produce no smoke, while comparative Sample #2 produces a tremendous amount of smoke. In addition, the disclosed composition produces a greater Elmendorf tear in the transverse direction than the other comparative samples.

Example 2

This example was conducted to demonstrate the manufacturing of a multilayered article that contains a core layer that comprises a polyolefin, thermoplastic starch and a compatibilizer. The thermoplastic starch used in these examples is wheat starch. The polyolefin is linear low density polyethylene. The compatibilizer is maleic anhydride grafted polyethylene. The multilayered article comprises 5 layers as detailed below.

The compounding of polyethylene-thermoplastic starch blends in a continuous process using a twin screw presents unique challenges. The starch is a fine and fluffy powder which difficult to feed. By itself it will slip on the screw surface and cause erratic feeding. It was found that injecting the glycerol early in the process and feeding at least some of the pellets (PE and/or MAH-g-PE) early in the process helped avoid starch feeding issues. The other issue with compounding polyethylene-thermoplastic starch blends is smoking caused by glycerol at temperatures above 185° C. and yellowing and degradation of starch at temperatures above 200° C. This smoking and degradation was controlled through screw design and operating conditions (feed rate,

TABLE 2

| Extruder Zone (A) | Actual Temperature (° C.) | Temperature/ Extruder Zone (B) | Actual Temperature (° C.) | Temperature/ Extruder Zone (C) | Actual Temperature (° C.) | Die Head | Actual Temperature (° C.) |
|---|---|---|---|---|---|---|---|
| Zone 1 | 180 | Zone 1 | 170 | Zone 1 | 180 | Zone 1 | 200 |
| Zone 2 | 195 | Zone 2 | 178 | Zone 2 | 190 | Zone 2 | 200 |
| Zone 3 | 195 | Zone 3 | 179 | Zone 3 | 190 | Zone 3 | 200 |
| Zone 4 | 195 | Zone 4 | 180 | Zone 4 | 190 | Zone 4 | 200 |
| Zone 5 | 195 | Zone 5 | 183 | Zone 5 | 190 | Zone 5 | 199 |
| Zone 6 | 195 | Zone 6 | 184 | Zone 6 | 190 | Zone 6 | 200 |
| Zone 7 | 195 | Zone 7 | 173 | Zone 7 | 190 | Zone 7 | 200 |
| Zone 8 | 195 | | | Zone 8 | 190 | | |
| Melt Temperature | 205 | Melt Temperature | 193 | Melt Temperature | 210 | | | barrel temperatures, screw speed). It is possible to make polyethylene-thermoplastic starch blends with 25 wt % and 50 wt % bio-content (starch and glycerol together constituted the bio-content) using a co-rotating twin screw extruder. The 50 wt % bio-content formulations by themselves don't have any useful properties but were intended to be used as concentrates that could be let-down or dry-blended machine-side prior to molding or extrusion. The materials used in this example are shown in Table 4.

TABLE 4

| Material | Description | Density (g/cc) | MI 2.16 kg (g/10 min@ 190° C.) | Supplier |
|---|---|---|---|---|
| DOWLEX ™ 2045G | LLDPE | 0.92 | 1 | The Dow Chemical Company |
| ELITE ™ 5400G | LLDPE | 0.916 | 1 | The Dow Chemical Company |
| ELITE ™ 5230G | LLDPE | 0.916 | 4 | The Dow Chemical Company |
| Supergell 1201 | Native wheat starch | ~1.42 | — | ADM |
| Glycerol | Plasticizer | ~1.26 | — | US Glycerin |
| AMPLIFY ™ GR 205 | MAH-g-PE* | 0.96 | 2 | The Dow Chemical Company |

*LLDPE = Linear Low Density Polyethylene, MAH-g-PE = Maleic Anhydride grafted Polyethylene Runs were performed on a Coperion ZSK 26 co-rotating twin screw extruder (TSE) with a 60 L/D ratio. The motor was rated at 40 horsepower, and the maximum screw speed is 1,200 revolutions per minute (RPM). A feed-rate of 30 to 40 lbs/hr and a screw speed of 350-400 RPM was used. Barrel temperatures were maintained at 150° C. A 20 inch Hg vacuum was pulled after mixing and prior to the die. The compounded material was extruded through a two hole strand die into a 16 foot long chilled water bath. The strands were then passed through a Berlyn Air Knife to remove excess water. Once the strands were cooled and dried they were pelletized with a Lab Tech side cut pelletizer (a strand cutter or an underwater pelletizer would work too).

All materials (except neat LLDPE's) were dried for 4 hours at 70° C. in a dessicant drier. Films were fabricated on the 5 Layer Blown Film line commercially available from LabTec. The features/specifications of this line were as follows:

Skins extruders: Two 25 mm extruders having a screw of a single flight with no mixing screws, screw length/diameter (L/D) ratio of 30:1 was used to produce the skin on the multilayer article. Three core extruders having 20 mm screws each with a flight no mixing screws, L/D 30:1. The die circumference was 75 millimeters. The die cut layer ratio for the 5 layers of the article was 30/10/20/10/30. The production rate was 35 to 42 lbs/hr. (3.8-4.5 lbs/inch die cir.) using a gravimetric feed system. The system employed a 550 mm width tower with a height adjustable upper nip. The system employed on line slitting with a dual turret winder.

1.5 mil monolayer films based on various PE/TPS compounds and LLDPE virgin resins were made. A co-extruded film having A/B/B/B/A structure was also made with A being ELITE™ 5230 G and B being compound D (see Table 7 below) which was a 25% bio-content blend based on Supergell 1201 and ELITE™ 5230 G.

Tables 5 and 6 show the process conditions used on the five layer LabTech blown film line. These conditions produced good film with all formulations tested. The films were processed at about 40 lb/hr. Table 5 shows the processing conditions in each of the 5 extruders (abbreviated as "Ext.").

TABLE 5

|  | Ext. 1 | Ext. 2 | Ext. 3 | Ext. 4 | Ext. 5 |
|---|---|---|---|---|---|
| Barrel 1, ° F. | 350 | 350 | 350 | 350 | 350 |
| Barrel 2, ° F. | 360 | 360 | 360 | 360 | 360 |
| Barrel 3, ° F. | 360 | 360 | 360 | 360 | 360 |
| Barrel 4, ° F. | 360 | | | | |
| Die, ° F. | 360 | 360 | 360 | 360 | 360 |
| Melt, ° F. | 340-360 | 340-360 | 340-360 | 340-360 | 340-360 |
| Speed, rpm, +/-1-0 | 70 | 37 | 100 | 34 | 90 |
| Pressure, psi, +/-300 | 4800 | 5600 | 5200 | 5600 | 4300 |

TABLE 6

| Pipe 1-5, ° F. | 365 |
|---|---|
| Layer 1-4, ° F. | 360-370 |
| Mandrel, ° F. | 365 |
| Line Speed, (feet per minute—fpm) | 40 |
| Lay Flat Width, inches | 12.5 |
| Blow-up ratio | 2.7 |
| Film Thickness, mils | 1.5 |
| Blower Speed, rpm | 1800-2200 |

The multilayered articles were subjected to mechanical testing. Machine direction (MD) and cross-machine direction (CD) Elmendorf Tear Strength were measured according to ASTM D1922, type B—Constant Radius. The Dart impact test was measured according to ASTM D1709. Haze and internal haze were measured as per ASTM D1003. Clarity was measured according to ASTM D1746.

Polyethylene-thermoplastic starch (PE-TPS) blend formulations were compounded on the twin screw extruder (TSE). The respective compositions are shown in the Table 7. The objective of the experiment was to develop a process for continuous compounding and also to make enough quantity (~50 lbs) to process this material on the blown film line. All solid ingredients were fed through the main feedthroat and glycerol was injected in barrel 3 of the extruder. Both 25 wt % bio-content (starch+glycerol) and 50 wt % bio-content PE-TPS blends were made. The latter were used as masterbatches (see e.g., see Sample #D in Table 7 below).

TABLE 7

| Data Sample # | A | B | C* | D | E |
|---|---|---|---|---|---|
| DOWLEX 2045G | | | | | 70 |
| ELITE 5400G | 70 | 40 | 50 | | |
| ELITE 5230G | | | | 70 | |
| AMPLIFY GR205 | 5 | 10 | | 5 | 5 |
| Glycerol (injected at Barrel 3) | 7.5 | 15 | | 7.5 | 7.5 |
| Supergell 1201 | 17.5 | 35 | | 17.5 | 17.5 |
| Masterbatch | | | 50 | | |
| Feeding | All ingredients (except glycerol) were fed through main feedthroat (Barrel 1). Glycerol was injected through Barrel 3. | | | | |

*The masterbatch contained a. 50:50 wt % blend with ELITE 5400G made in a twin screw Table 8 shows the abbreviations used for describing the films and the associated databook numbers. Also the term "Masterbatch" represents the sample based on the 50 wt % bio-content masterbatch (MB) this was letdown at 50 wt % into ELITE™ 5230 G to maintain a final 25 wt % bio-content. The letdown was done in a twin screw extruder. Their key physical properties are summarized in Table 9.

TABLE 8

| Data Sample # | Description |
|---|---|
| A | 25% Supergel/ELITE 5400G |
| B | 25% Supergel/ELITE 5400G from MB |
| C | 25% Supergel/ELITE 5230G-mono |
| D | 25% Supergel/ELITE 5230G-coex |
| E | 25% Supergel/DOWLEX 2045G |

TABLE 9

| | | Comp. Sample #3 | Comp. Sample #4 | Comp. Sample #5 | Comp. Sample #6 | Sample #2 | Comp. Sample #7 | Sample #3 | Comp. Sample #8 |
|---|---|---|---|---|---|---|---|---|---|
| | | | | | Compound Description | | | | |
| | | ELITE 5230G | ELITE 5400G | DOWLEX 2045G | 25% Supergell/ ELITE 5400G | 25% Supergell/ ELITE 5400G from MB | 25% Supergell/ ELITE 5230G-mono | 25% Supergell/ ELITE 5230G-coex | 25% Supergell/ DOWLEX 2045G |
| | | | | | Comparative (Comp)/Inventive (Inv) | | | | |
| | | Comp | Comp | Comp | Comp | Inv Material | Comp | Inv | Comp |
| Test Name | Unit | ELITE 5230G | ELITE 5400G | DOWLEX 2045G | Data Sample #A | Data Sample #B | Data Sample #C | Data Sample #D | Data Sample #E |
| Clarity | % | 97 | 98 | 97 | 22 | 85 | 26 | 81 | 37 |
| Dart Drop Impact | g | 322 | 492 | 253 | 500 | 409 | 229 | 235 | 226 |
| Total Haze | % | 15 | 14 | 12 | 84 | 51 | 79 | 7 | 78 |
| Internal Haze | % | 3.6 | 2.3 | 2.2 | 2.2 | 1.3 | 1.9 | 1.8 | 2.3 |
| Secant Modulus at 1%-CD | psi | 23954 | 28483 | 27328 | 28887 | 25622 | 27006 | 24215 | 37410 |
| Secant Modulus at 1%-MD | psi | 22497 | 25097 | 28789 | 20845 | 22311 | 21813 | 25067 | 27053 |
| Tear: Elmendorf - Type B-CD | g/mil | 737 | 743 | 798 | 893 | 826 | 854 | 825 | 876 |
| Tear: Elmendorf - Type B-MD | g/mil | 517 | 387 | 517 | 299 | 534 | 641 | 655 | 406 |

From the Table 9, it can be seen that the comparative sample #s 3-8 were monolayer films. Comparative sample #s 3-5 were monolayers that contained only polyolefins (without starch), while comparative sample #s 6 7 and 8 were monolayers that contained both starch and polyolefins. Comparative sample #3 is a monolayer film based on both starch and polyolefins but was prepared from a masterbatch (based on Sample C from Table 7) and an additional mixing step in the twin screw and it exhibits good clarity. Sample #s 2 and 3 were multilayer articles that contained both starch and polyolefins in the 3 interior layers while the skin layers did not contain any thermoplastic starch. Sample #3 uses the masterbatch sample C from the Table 7 above. The following conclusions can be drawn from the data in the Table 9.

Haze and clarity deteriorate significantly with the inclusion of starch in monolayer films as compared to the LLDPE controls. The total haze has two components-surface haze and internal haze. The haze is mainly due to surface haze and not due to internal haze.

Clarity (but not haze) can be improved by using a masterbatch and then letting-down the masterbatch in a twin screw extruder (this helps refine morphology) before extruding into a monolayer film.

Both haze and clarity are improved significantly in the co-extruded film having polyethylene skins compared to the monolayer films.

Comparable CD and MD properties (modulus, Dart impact and Tear) were seen with all PE/TPS films versus virgin LLDPE films In summary at least approximately about 5 wt % of MAH-g-PE is used for compatibilization of polyethylene with thermoplastic starch. About 30 to 40 wt % of glycerol in the thermoplastic starch phase is used to develop optimum physical properties. Less glycerol resulted in a brittle material and higher amounts of glycerol resulted in poor mechanical properties.

The films obtained showed modulus, tear strength and dart impact properties comparable to that of the base polyethylenes used. The optical properties generally deteriorated in the polyethylene-thermoplastic starch blends and this was seen in reduced clarity and increased haze. The haze and clarity could be improved by co-extruding with PE skins; this result could be exploited in commercial applications. The haze was mainly due to surface haze and the low internal haze measurements of polyethylene-thermoplastic starch blends support this finding. Clarity (but not haze) in mono-layer films can be improved by morphology refinement by re-compounding the material in a twin screw extruder.

What is claimed is:

1. A multilayered article comprising:
    a core layer comprising a thermoplastic polymer; where the thermoplastic polymer comprises a polyolefin, thermoplastic starch, and a compatibilizer; where the compatibilizer does not contain ethylene acrylic acid; where the polyolefin is not polypropylene and where the polyolefin is present in an amount of greater than 40 wt %, based on a total weight of the core layer;
    a first layer comprising a thermoplastic resin; and
    a second layer comprising a thermoplastic resin; where the first layer and the second layer are devoid of fillers; where the first layer is disposed on a side of the core layer that is opposed to the side that contacts the second layer; where the multilayered article has an optical clarity of greater than 80% when measured as per ASTM D 1746 and a total haze less than 10% when measured as per ASTM D 1003; where the article displays a machine direction Elmendorf tear strength of 400 to 900 grams when measured as per ASTM D1922; a cross machine direction Elmendorf tear strength of 750 to 1200 grams when measured as per ASTM D1922; and a dart impact strength measured as per ASTM D1709 is 200 to 450 grams.

2. The multilayered article of claim 1, where the thermoplastic starch comprises wheat starch.

3. The multilayered article of claim 1, where the polyolefin is linear low density polyethylene having a density of 0.905 g/cm$^3$ to 0.940 g/cm$^3$.

4. The multilayered article of claim 3, where the linear low density polyethylene is present in an amount of 50 to 75 wt % , based on the total weight of the core layer.

5. The multilayered article of claim 1, where the compatibilizer is present in an amount of less than 10 wt %, based on the total weight of the core layer.

6. The multilayered article of claim 1, where the first layer and the second layer comprise a linear low density polyethylene.

7. The multilayered article of claim 1, where the core layer comprises 2 to 20 wt % of the thermoplastic starch.

8. The multilayered article of claim 1, where the article displays a 1% secant modulus of 135 to 200 MPa when measured in the machine direction and a 1% secant modulus of 130 to 190 MPa when measured in the transverse direction, when measured as per ASTM D882.

* * * * *